United States Patent Office 3,830,909
Patented Aug. 20, 1974

3,830,909
METHOD FOR THE PRODUCTION OF ANTI-AUSTRALIA ANTIGEN ANTISERUM
Zenro Hayakawa, Matsumoto, Japan, assignor to Tokyo Standard Serums, Ltd., Tokyo, Japan
No Drawing. Filed Nov. 8, 1971, Ser. No. 196,726
Claims priority, application Japan, Nov. 9, 1970, 45/98,953
Int. Cl. C12k 1/10; G01n 31/02, 33/16
U.S. Cl. 424—12                5 Claims

ABSTRACT OF THE DISCLOSURE

Anti-Australia antigen antiserum is produced by immunizing a warm-blooded animal with a complex of Australia antigen and anti-Australia antigen antibody and absorbing the immune serum of the immunized animal with water-insolubilized serum protein of Australia antigen negative human serum. Thus-produced antiserum contains anti-Australia antigen antibody in a titer of not less than 32 and gives no positive reaction with Australia antigen negative human serum.

---

This invention relates to a method for producing anti-Australia antigen antiserum.

Australia antigen is an antigen which is found at relatively high frequency in the sera of patients with leukaemia and mongolism or the like. This antigen is also found in the sera of 1% or more of normal persons. Since the original studies were done using the serum of an Australian aborigine, this antigen has been called Australia antigen. 70–80% persons among the patients who received transfusion of 200 ml. of blood containing Australia antigen are attacked by serum-haepatitis, the said morbidity rate being far higher than that of persons who received transfusion of normal blood, i.e., not containing the antigen. This fact clearly suggests that Australia antigen is a strong cause of serum-haepatitis after transfusion. Therefore, it is proposed throughout the world to test and eliminate blood containing Australia antigen from all blood pools for transfusion.

The presence of Australia antigen in blood can be checked with the use of an antibody which specifically react with Australia antigen, i.e. anti-Australia antigen antibody, and there have been proposed many test methods such a Micro-Ouchterlony method, Electrosyneresis method, Complement fixation method and Immuno- adherence method, all of which employ antiserum containing the said antibody (i.e. anti-Australia antigen antiserum). Thus, enormous amount of anti-Australia antigen antiserum is required for testing all the blood for transfusion. However, it has been difficult to prepare anti-Australia antigen antiserum of good qualities on an industrial scale. That is, anti-Australia antigen antiserum of human origin has been obtained from the blood of patients with particular diseases e.g. haemophilia and thalassemia who had received transfusions repeatedly. As the production of anti-Australia antigen antiserum of animal origin, there was reported an achievement at a laboratory scale wherein the whole serum of human containing Australia antigen was injected to rabbits and the resulting immune serum was absorbed with the whole human serum not containing Australia antigen ("Nature", Vol. 210, page 1340 et seq. (1966)). However, not only the titer of the objective anti-Australia antigen antibody contained in the immune serum obtained by the said immunization is relatively low but also the immune serum contains many other antibodies caused by the various antigens contained in the whole serum employed for the immunization, and therefore, the antiserum obtained by absorbing this immune serum with the whole serum contains only a low titer of the objective antibody. Thus, the anti-Australia antigen antiserum prepared by the known method can not be utilized for the exact identification and titration of Australia antigen.

Under such technical circumstances, it has been a strong desideratum among the artisans to establish an industrially feasible process for producing anti-Australia antigen antiserum of animal origin which contains a high titer of anti-Australia antigen antibody and which gives a clear reaction selectively with Australia antigen.

The principal object of this invention is to provide a novel and industrially advantageous method for producing anti-Australian antigen antiserum of animal origin.

Another object of this invention is to provide a novel anti-Australia antigen antiserum of animal origin having excellent properties for practical use, i.e. which contains a high titer of anti-Australia antigen antibody and which gives no positive reaction with human serum not containing Australia antigen.

Said objects are realized by immunizing a warm-blooded animal with a complex of Australia antigen and anti-Australia antigen antibody and absorbing the immune serum of the immunized animal with water-insolubilized serum protein of human serum not containing Australia antigen (hereinafter the serum is briefly referred to as "Australia antigen negative human serum").

The term "warm-blooded animal" as used throughout the present specification as well as appended Claims means "warm-blooded animal other than human being." As the typical examples of such animals, there may be enumerated guinea pig, rabbit, goat and the like.

The complex of Australia antigen and anti-Australia antigen antibody may be prepared by reacting Australia antigen with anti-Australia antigen antibody in per se established manner for general antigen antibody complexes. Advantageous use is made of complex of Australian antigen and anti-Australia antigen antibody formed as precipitin band in a gel reaction system. Thus, the formation of the complex may be preferably carried out, for example, in the following manner.

A solution of agar in a suitable buffer solution e.g. barbital buffer solution, tris buffer solution or phosphate buffer solution is poured on glass plates so as to give flat agar gel. Two grooves are made in parallel at a suitable interval e.g. 3 to 7 mm. on each agar gel. One of the grooves on each agar gel is charged with a human serum containing Australia antigen (hereinafter briefly referred to as "Australia antigen positive human serum"), while another of the grooves is charged with anti-Australia antigen antiserum. As the anti-Australia antigen antiserum, there may be employed the antiserum of human origin, the antiserum of warm-blooded animal origin or a mixture thereof.

Then, the agar gels are incubated at room temperature. With the lapse of incubation period, the complex of Australia antigen and anti-Australia antigen antibody is formed as clear single precipitin band between two grooves in each agar gels. Generally, the incubation for about 48 to about 96 hours is sufficient to form the complex. The said incubation period may be remarkably shortened by applying an electric current to the agar gels in the per se known manner for some Australia antigen testing methods such as Electrosyneresis method. The complex of Australia antigen and anti-Australia antigen antibody thus formed as the precipitin band in the agar gels is recovered from the agar gels. Practically, the precipitin band is recovered by cutting from the whole agar gel system into a form being adhered to about 1–6 mm. thickness of the gel. Thus-recovered precipitin band is subjected to dialysis against flowing water and subsequently a physiological saline, and then is emulsified. Total dialysis period is advantageously from about 3 to about 8 days.

Thus-treated precipitin band as it is is employable as the complex.

The immunization of the warm-blooded animal with the complex of Australia antigen and anti-Australia antigen antibody is practically effected by injecting the complex into the animal. Especially, intradermal injection gives the good results.

Injection dose, times and intervals of injection may be chosen depending upon the kinds of warm-blooded animals to be immunized and the like. For example, when the above emulsified precipitin band is employed as the complex, advantageous dose at each injection is about 0.1 to 0.5 ml. per guinea pig, about 1 to 5 ml. per rabbit and about 2 to 10 ml. per goat.

Injection is preferably conducted at least twice and repeated till sufficient immunization is attained. The complex may be injected into the animals as the mixture with a suitable adjuvant e.g. Freund's complete or incomplete adjuvant or, with a physiological saline. It is recommended at least for the first injection to employ an emulsion containing Freund's complete adjuvant.

The immune serum is taken from the immunized animals and inactivated by heating in *per se* established manner.

In the method of this invention, thus-obtained immune serum is subjected to absorption with water-in-solubilized serum protein of Australia antigen negative human serum. The insolubilized serum protein may be prepared by treating Australia antigen negative human serum with an insolubilizing agent by the *per se* established method, e.g. described in "Immunochemistry," Vol. 6, page 53 *et seq.* (1969). As the insolubilizing agent, there may be employed, for example, glutaraldehyde, ethyl chloroformate, N-acetylhomocysteine thiolactone, bromoacetyl celulose, p-aminophenylbutyryl-aminoethyl celluose, ethylene-maleic anyhdride copolymer and the like. Among those insolubilizing agents, glutaraldehyde is most advantageously employed. It is recommended to dialyze Australia antigen negative human serum against a physiological saline before treatment with such an insolubilizing agent.

The absorption of the immune serum with the water-insolubilized serum protein is conducted by homogeneously admixing the immune serum with the water-insolubilized serum protein and incubating the resulting mixture at room temperature (about 1 to 35° C.) and then recovering the liquid portion from the mixture. Practically, it is recommended to admix the immune serum with the water-insolubilized serum protein in a volume ratio of from about 1:1 to about 1:5 and incubate the mixture under intermittent shaking. Though incubation period may vary with the above volume ratio and the like, incubation for about 5 to about 50 hours generally gives good results.

Thus-recovered liquid portion can be used, as the anti-Australia antigen antiserum of this invention, *per se* or diluted with a suitable diluent such as a physiological saline or distilled water, depending on its titer of anti-Australia antigen antibody as well as the test methods in which the antiserum is employed.

The anti-Australia antigen antiserum thus-prepared is characterized by its high titer of anti-Austrailia antigen antibody as well as by its selective reaction with Australia antigen. That is to say, the anti-Australia antigen antiserum in a form ready for use contains anti-Australia antigen antibody in a titer of not less than 32 and it gives no positive reaction with Australia antigen negative human serum. Throughout the present specification as well as appended Claims, the titer of anti-Australia antigen antibody is determined as the reciprocal number of the highest dilution of the anti-Australia antigen antiserum for exhibiting precipitin band with Australia antigen positive human serum employing Micro-Ouchterlony method as described e.g. in page 964 *et seq.* of "Memorandum on Viral Hepatitis and Tests for the Australia (hepatitis-associated) Antigen and Antibody" published by World Health Organization in 1970. In this titration use is made of a standard Australia antigen positive human serum which gives secure positive reactions with anti-Australia antigen antisera of various origins. One of such standard sera is stored under the number "S–82728" at the Department of Allergology (Dr. T. Matsuhashi), The Institute of Medical Science, University of Tokyo, Minato-ku, Tokyo, Japan.

The anti-Australia antigen antiserum of this invention can be employed for screening the blood for transfusion in optional test methods e.g. described hereinafter similarly to anti-Australia antigen antiserum of human origin.

The test methods employed in Test and Examples are described in the following literatures, respectively.

Electrosyneresis method is described in "Igaku No Ayumi (Advances in medicine)" published by Ishiyaku Publishers, Inc., Tokyo, Vol. 73, No. 4, page 169 *et seq.* (1970).

Complement fiixation method is described in "Igaku No Ayumi," Vol. 72, No. 12, page 604 *et seq.* (1970).

Immuno-adherence method is described on page 110 *et seq.* of "The Structure and Action of Protein" published by Harper and Row Publisher, New York, in 1970.

The following Examples are merely intended to illustrate presently preferred embodiment of this invention and not to restrict the scope of this invention.

The Comparative Example illustrates a typical preparation of the water-insolubilized serum protein of Australia antigen negative human serum.

Throughout the foregoing descrption as well as in the following: The Comparative Example, Examples, Test and Claims, "mm.," "ml.," "M," "r.p.m." and "° C." respectively refer to "millimeter(s)," "milliliter(s)," "molar concentration," "revolutions per minute" and "degrees centigrade" and percentages are weight/volume unless otherwise specified.

The Comparative Example 100 ml. of Australia antigen negative human serum was dialyzed against a physiological saline at room temperature for 24 hours and then admixed with 10 ml. of 2M-acetate buffer solution of pH 5.0. To the mixture is added dropwise 33 ml. of a 2.5% aqueous solution of glutaraldehyde whereby gel is formed. After the completion of the addition, the mixture is kept standing at room temperature for 5 hours. The gel recovered from the mixture by filtration is washed by centrifugation with 0.01M-phosphate saline buffer of pH 7.4 until the supernatant shows an optical density of not higher than 0.1 at 280 millimicrons. The gel is suspended into 1,000 ml. of a glycine-HCl buffer of pH 2.8 and the suspension is homogenized in a homogenizer. The mixture is centrifuged at 3,000 r.p.m. for 30 minutes to separate supernatant portion. The resulting flocculi are suspended into 400 ml. of a mixture of an aqueous 1M-$K_2HPO_4$ solution and water in a volume ratio of 1:4, followed by a further homogenization. The mixture is again centrifuged under the same conditions as above and the following flocculi are washed by centrifugation with 0.01M-phosphate saline buffer of pH 7.4 until the supernatant shows an optical density of not higher than 0.05 at 280 millimicrons to give the water-insolubilized serum protein which can be employed as the absorbent in the method of this invention.

Example 1

A 1.2% solution of agar in a barbital buffer solution of pH 8.6 was poured on glass plates (25 mm. x 100 mm.) so as to give flat agar gels of 1.5 mm. thickness. On each agar gel, two grooves (3 mm. in width x 80 mm. in length x 1.5 mm. in the depth) were made in parallel at an interval of 5 mm. One of the grooves was filled with Australia antigen positive human serum, while another groove was filled with a serum obtained from a haemophiliac who had repeatedly received transfusions, the serum having been confirmed to show an anti-Australia antigen antibody titer of 2. Each of the agar gels was placed in a humidified sealed box and incubated at room temperature for 48 hours, whereby clear single precipitin band was formed between the two grooves. The precipitin bands were cut from the gel plate into a form being adhered to 1.5 mm. thickness of agar gel, combined each other, dialyzed against flowing water for 72 hours and washed well with a physiological saline.

temperature for 12 hours, and then subjected to filtration under reduced pressure with employment of Nutsche funnel to give an antiserum.

The changes of R-45 serum and G-17 serum by the respective absorption treatments is reactivity against Australia antigen positive human serum and Australia antigen negative human serum were determined by Electrosyneresis method and changes in titer of anti-Australia antigen antibody were determined. The results are summarized in Tables 1 and 2, respectively.

TABLE 1.—CHANGES IN REACTIVITY

| | Absorbent | | | | | | | | | | | | |
|---|---|---|---|---|---|---|---|---|---|---|---|---|---|
| | The whole serum | | | | | | The water-insolubilized serum protein | | | | | | Before absorption |
| | Volume ratio of immune serum:absorbent | | | | | | | | | | | | |
| | 1:1 | | 1:2 | | 1:3 | | 1:1 | | 1:2 | | 1:3 | | |
| Test serum | Au(+) | Au(−) | Au(+) | Au(−) | Au(+) | Au(−) | Au(+) | Au(−) | Au(+) | Au(−) | Au(+) | Au(−) | Au(+) Au(−) |
| Immune serum: | | | | | | | | | | | | | |
| R-45 serum | + | + | + | + | − | − | + | − | + | − | + | − | + + |
| G-17 serum | + | + | ± | ± | ± | − | + | − | + | − | − | − | + + |

Note.—Au(+)=Australia antigen positive human serum; Au(−)=Australia antigen negative human serum; +=Clear precipitin band formed; ±=Vague precipitin band formed; −−=None precipitin band formed.

TABLE 2.—CHANGES IN TITER

| | Absorbent | | | | | |
|---|---|---|---|---|---|---|
| | The whole serum | | The water-insolubilized serum protein | | | |
| | Volume ratio of immune serum: absorbent | | | | Before absorption | |
| | 1:1 | | 1:1 | | | |
| Test serum | Au(+) | Au(−) | Au(+) | Au(−) | Au(+) | Au(−) |
| Immune serum: | | | | | | |
| R-45 serum | 0 | 0 | 32 | 0 | 128 | 128 |
| G-17 serum | 0 | 0 | 64 | 0 | 64 | 64 |

Note.—Au(+)=Australia antigen positive human serum; Au(−)=Australia antigen negative human serum.

Half portion of the precipitin band mixture was homogeneously admixed with an equal volume of Freund's complete adjuvant to give an emulsion (Emulsion A), while the remaining portion was homogeneously admixed with an equal volume of a physiological saline to give another emulsion (Emulsion B).

Emulsion A was intradermally injected to 6 rabbits and 14 guinea pigs under the following conditions:

Injection parts _____ Paw and back.
Interval of injection _____ 14 days.
Injection times _____ 6.
Dose of one-time injection _____ Emulsion A prepared from 4 precipitin bands was employed for one rabbit or for 10 guinea pigs.

At 7 days after the sixth injection, Emulsion B was intradermally injected to the animals at a dose corresponding that described above. At 10 days after the last injection, immune serum was taken from the immunized animals in *per se* established manner, inactivated by heating at 56° C. for 30 minutes. The respective sera were stored in a refrigerator after addition of 0.1% of sodium azide.

Among thus-obtained immune sera, the immune serum obtained from an immunized rabbit (designated as R-45 serum) and the immune serum obtained from an immunized guinea pig (designated as G-17 serum) were subjected to the following absorption treatments:

R-45 serum and G-17 serum were divided into 6 portions, respectively. Each portion was homogeneously admixed with the water-insolubilized serum portion of Australia antigen negative human serum prepared in The Comparative Example or the whole serum of Australia antigen negative human serum in the volume ratios listed below in Table 1. Each of the resulting mixtures was incubated under intermittent shaking at room On the other hand, the above-stored immune sera other than R-45 serum and G-17 serum were subjected, respectively, to absorption with an equal volume of the water-insolubilized serum protein under the same conditions as described above to give anti-Australia antigen antisera.

Example 2

A 0.8% solution of agar in barbital buffer solution of pH 8.6 was poured on glass plates (25 x 100 mm.) so as to give flat agar gels of 5 mm. thickness. On each agar gel, two grooves (3 mm. in width x 50 mm. in length x 5 mm. in depth) were made in parallel at an interval of 5 mm. One of the grooves was filled with Australia antigen positive human serum, while another groove was filled with a mixture of anti-Australia antigen antiserum of human origin obtained from a haemophiliac and anti-Australia antigen antiserum of rabbit origin prepared in Example 1 in a volume ratio of about 1:1, the antibody titer of said mixture being 16. Each of the agar gels on the plates was placed in a humidified sealed box and incubated for 72 hours, whereby a clear single precipitin band was formed between the two grooves. The precipitin bands were recovered in a form being adhered to 5 mm. thickness of agar gel from the whole gels by cutting, combined each other, dialyzed against flowing water for 72 hours and subsequently against a physiological saline for 24 hours. The sequence of dialysis was twice repeated. Half portion of the precipitin band mixture was homogeneously admixed with an equal volume of Freund's complete adjuvant to give an emulsion.

The emulsion was intradermally injected to 138 guinea pigs and 10 rabbits at their paws and backs, and to 2 goats at their back and belly, at the doses of 0.5 ml. per guinea pig, 5 ml. per rabbit and 10 ml. per goat.

At 49 days after the said injection, another emulsion prepared by admixing the remaining portion of the precipitin band mixture with an equal volume of a physiological saline was intradermally injected to the respective animals at the same doses as described above.

At 10 days after the last injection, immune serum was taken from each immunized animal in *per se* established manner, and inactivated by heating at 56° C. for 30 minutes. After addition of 0.1% of sodium azide, the respective sera were stored in a refrigerator.

The immune sera were subjected, respectively, to the absorption with an equal volume of the water-insolubilized serum protein of Australia antigen negative human serum prepared in Reference under the same conditions as described in Example 1 to give anti-Australia antigen antisera.

The titer of anti-Australia antigen antibody was determined with regard to the respective antisera.

The mean antibody titers for the guinea pigs antisera, rabbits antisera and goats antisera are listed in Table 3.

TABLE 3

| Antisera | Mean antibody titer |
|---|---|
| Of guinea pig origin | 128 |
| Of rabbit origin | 64 |
| Of goat origin | 32 |

Test

Sera of forty human subjects were tested employing anti-Australia antigen antiserum of rabbit origin and anti-Australia antigen antiserum of guinea pig origin, both having been prepared in Example 1, and anti-Australia antigen antiserum of human origin obtained from a haemophiliac who had repeatedly received transfusions, by Micro-Ouchterlony method, Electrosyneresis method, Immuno-adherence method and Complement fixation method.

The results are summarized in Table 4, wherein the data obtained on the sera of thirty-three subjects which indicated no positive reaction against all the antisera are omitted.

The said results clearly demonstrate that anti-Australia antigen antiserum of animal origin of the present invention gives specific and clear reaction with Australia antigen positive human sera, and therefore, that it can be employed for screening the blood for transfusion similarly to anti-Australia antigen antiserum of human origin.

Having thus disclosed the invention, what is claimed is:

1. A method for producing anti-Australia antigen antiserum which comprises immunizing a warm-blooded animal with a complex which is the precipitin band formed by the reaction between Australia antigen positive human serum and anti-Australia antigen antiserum in an agar gel, and absorbing the immune serum of the immunized animal with water-insolubilized serum protein of Australia antigen negative human serum.

2. The method of claim 1, wherein the warm-blooded animal is selected from the group consisting of guinea pig, rabbit and goat.

3. The method of claim 1, wherein the immunization is carried out by intradermally injecting the complex into the warm-blooded animal.

4. The method of claim 1, wherein the absorption is carried out by homogenously admixing the immune serum with the water-insolubilized serum protein in a volume ratio of from about 1:1 to about 1:5, incubating the resulting mixture at room temperature for about 5 to about 50 hours and then recovering the liquid portion from the mixture.

5. The method of claim 1, wherein the water-insolubilized serum protein is prepared by treating Australia antigen negative human serum with glutaraldehyde.

TABLE 4

| Antiserum and its dilution factor in test | Micro-Ouchterlony method | | | Electrosyneresis method | | | Immuno-adherence method | | | Complement fixation method | | |
|---|---|---|---|---|---|---|---|---|---|---|---|---|
| | R, 1:1 | G, 1:1 | H, 1:1 | R, 1:1 | G, 1:16 | H, 1:1 | R, 1:20 | G, 1:20 | H, 1:15 | R, 1:32 | G, 1:8 | H, 1:1 |
| Subject number: | | | | | | | | | | | | |
| 7 | + | + | + | + | + | + | +(25) | +(25) | +(25) | + | + | + |
| 12 | − | − | − | − | − | − | +(27) | +(27) | (*) | − | − | − |
| 13 | − | − | − | − | − | − | (*) | +(27) | +(25) | − | − | − |
| 20 | + | + | + | + | + | + | +(27) | +(27) | +(26) | + | + | + |
| 23 | − | − | − | − | − | − | +(27) | +(26) | (*) | ± | − | − |
| 28 | − | − | − | + | + | + | − | − | − | + | + | + |
| 38 | + | + | + | + | + | + | +(27) | +(27) | +(25) | + | + | + |

*Determination was impossible.

NOTE.—R = Anti-Australia antigen antiserum of rabbit origin; G = Anti-Australia antigen antiserum of guinea pig origin; H = Anti-Australia antigen antiserum of human origin; + = Positive reaction; ± = Vague positive reaction; − = No positive reaction.

References Cited

UNITED STATES PATENTS 3,639,559  2/1972  Tax _____ 424—12
3,410,839  11/1968  De Carvalho _____ 424—12 X

OTHER REFERENCES

Millman, Nature, vol. 226, Apr. 14, 1970, pp. 83–84.
Melartin, Nature, vol. 210, June 25, 1966, pp. 1340–41.
Avrames Immunochemistry, vol. 6, No. 1, 1969, pp. 53–66.
Lerner PSEBM, vol. 114, 1963, pp. 270–273.
Kabat, Exptl. Immunochem. C. C. Thomas, Springfield, Ill., 2nd ed., 1961, pp. 67–69, 282, 333–337, 352–3, 642–643, 789–791.
Hayakawa, Ogawa and Ikuta, Japanese J. Clin. Med., vol. 28, November 1970, pp. 2712–5.

ALBERT T. MEYERS, Primary Examiner

A. P. FAGELSON, Assistant Examiner

U.S. Cl. X.R.

424—86, 89; 260—112 B